United States Patent [19]

Liebert

[11] 4,023,363
[45] May 17, 1977

[54] AUXILIARY POWER STEERING SYSTEMS FOR HEAVY DUTY VEHICLES

[75] Inventor: Karl-Heinz Liebert, Schwabisch-Gmund, Germany

[73] Assignee: Zahnradfabrik Friedrichshafen AG, Friedrichshafen, Germany

[22] Filed: July 6, 1976

[21] Appl. No.: 702,451

[52] U.S. Cl. .................................. 60/385; 60/386; 60/468; 91/401
[51] Int. Cl.$^2$ ........................................ F15B 11/20
[58] Field of Search ............. 60/384, 385, 386, 403, 60/405, 468; 91/394, 401, 411 R

[56] References Cited

UNITED STATES PATENTS

| | | | |
|---|---|---|---|
| 2,462,580 | 2/1949 | Watson | 91/411 R X |
| 3,520,135 | 7/1970 | Liebert | 60/384 |
| 3,554,089 | 1/1971 | Lang | 91/412 |
| 3,878,763 | 4/1975 | Lang | 91/391 |

FOREIGN PATENTS OR APPLICATIONS 517,314   1/1940   United Kingdom .................. 91/411

Primary Examiner—Edgar W. Geoghegan

[57] ABSTRACT

Dual double acting servomotors hydraulically pressurized are provided wherein the pistons have shunt valve means actuatable at limit of movement of the pistons to shunt high pressure fluid at one side of the piston to the low pressure side of the piston then being exhausted. This results in relieving the stress otherwise effected against steering mechanism limit stops by continued application of high pressure feed to the pressurized chamber. The system encompasses steering control and shunt circuit valve means automatically actuated by differential pressures so as to direct pressure and exhaust flow selectively to and from the chambers of the respective cylinders from an engine driven pump and a manual metering pump for operating the steered wheels of heavy duty vehicles and which valve means effects bypassing of the engine driven pump pressure feed directly to one servomotor while feeding the combined pressures of that pump and the metering pump to the other. Both servomotors act to effect steering with no loss of synchronization.

10 Claims, 3 Drawing Figures

AUXILIARY POWER STEERING SYSTEMS FOR HEAVY DUTY VEHICLES

Auxiliary power steering systems for heavy duty vehicles, particularly the kind which use a pair of steered wheels carried at the ends of the member which forms the link of a toggle joint, require considerable hydraulic flow volume. Such systems generally used conventional arrangements of manually operated metering pumps in conjunction with power operated engine driven pumps as found in common practice. However, where large volume hydraulic flow is required, the usual size of metering pumps is insufficient to provide the flow needed for proper maneuverability of a vehicle. Therefore, in heavy vehicle applications it has been known to use a metering pump flow for one servomotor and engine driven flow for the other servomotor which bypasses the flow circuit of the metering pump. In such systems, a connecting valve in addition to the usual steering control valve is provided for separating the outputs of the two pumps, which connecting valve is actuated by a pressure difference in the pressure chambers of one of the servomotors or by pressure difference in the pressure chambers of both servomotors. Reference is made to German Patent publications AS 1 755 225 and OS 1 942 086.

In another system as exemplified in German OS 1 755 033 a single control valve effects to control systems by means of symmetrical arrangement of the lands and grooves of a piston, i.e., a spool valve. In such arrangement a first control system conducts the metering pump flow to one servomotor and the power flow effected by the engine driven pump goes to the other servomotor, bypassing the metering pump flow. The previously briefly described systems have disadvantages in that when the steered wheels have reached maximum steered position, the steering linkage travel is limited by abutting limiting stops and held against such stops with the full force of operating pressure provided by the combined pressures of power and manual pumps. It can readily be seen that where toggle joint steering arrangements are used, limiting stops must be made exceedingly strong to absorb the high stresses imposed.

A prior art arrangement has been known using a single servomotor wherein the output of the power pump is communicated with exhaust pressure by means of a complex valving arrangement in order to relieve stresses at the limits of steering movement of the steering mechanism. Reference is made to German AS No. 2 257 230 and German OS No. 2 249 181. However, such arrangements are very expensive due to the requirement for additional valves and hydraulic conduits.

The present invention provides a solution for relieving physical stress on limiting stops in apparatus of the kind described herein in a very simple manner and with minimum of expense. Briefly, the usual dual double acting cylinder servomotors are provided acting in parallelism and forming a parallelgram linkage effecting a toggle joint with a front end axle member that carries the steered wheels. The piston of each cylinder is provided with a throughbore or passage having a pair of back-to-back ball check valves therein biased by a common intermediate spring and proximate respective pressure chamber so that normal flow from one pressure chamber to the other through the piston is blocked.

One of the check valves in each piston is provided with a pin which can engage the bottom of the respective cylinder thereby opening the passage at that face of the piston when the piston has reached a predetermined position in its travel relative to the respective end of the cylinder. Such end of the cylinder effects the low pressure chamber at that time being connected via valving to an exhaust line. However, the other end or pressure chamber of the cylinder is fed high pressure which can then open the check valve at that face of the piston. Therefore, flow is shunted from the high to the low pressure chambers through the piston substantially reducing the driving force acting on the steering mechanism. The pressure of that particular servomotor comes only from the power pump to effect the steering in a selected direction. At that time, the other servomotor is pressure fed by additive pressures of the manually operated metering pump and the power pump.

A valving arrangement is provided for controlling pressure and exhaust flow selectively to the various pressure chambers. Such arrangement incorporates means operated by the differential pressure between the pressurized chambers of the two servomotors, effected by the metering pump, all coacting to provide the proper interconnections for pressure and exhaust flow to effect the flow functions in either direction of steering.

A detailed description of the invention now follows in conjunction with the appended drawings, wherein FIG. 1 is a schematic diagram of the hydraulic circuitry and primary components of the system shown in the neutral position for straight ahead steering comprising valve means having two separate piston or spool valves;

Figure 1:
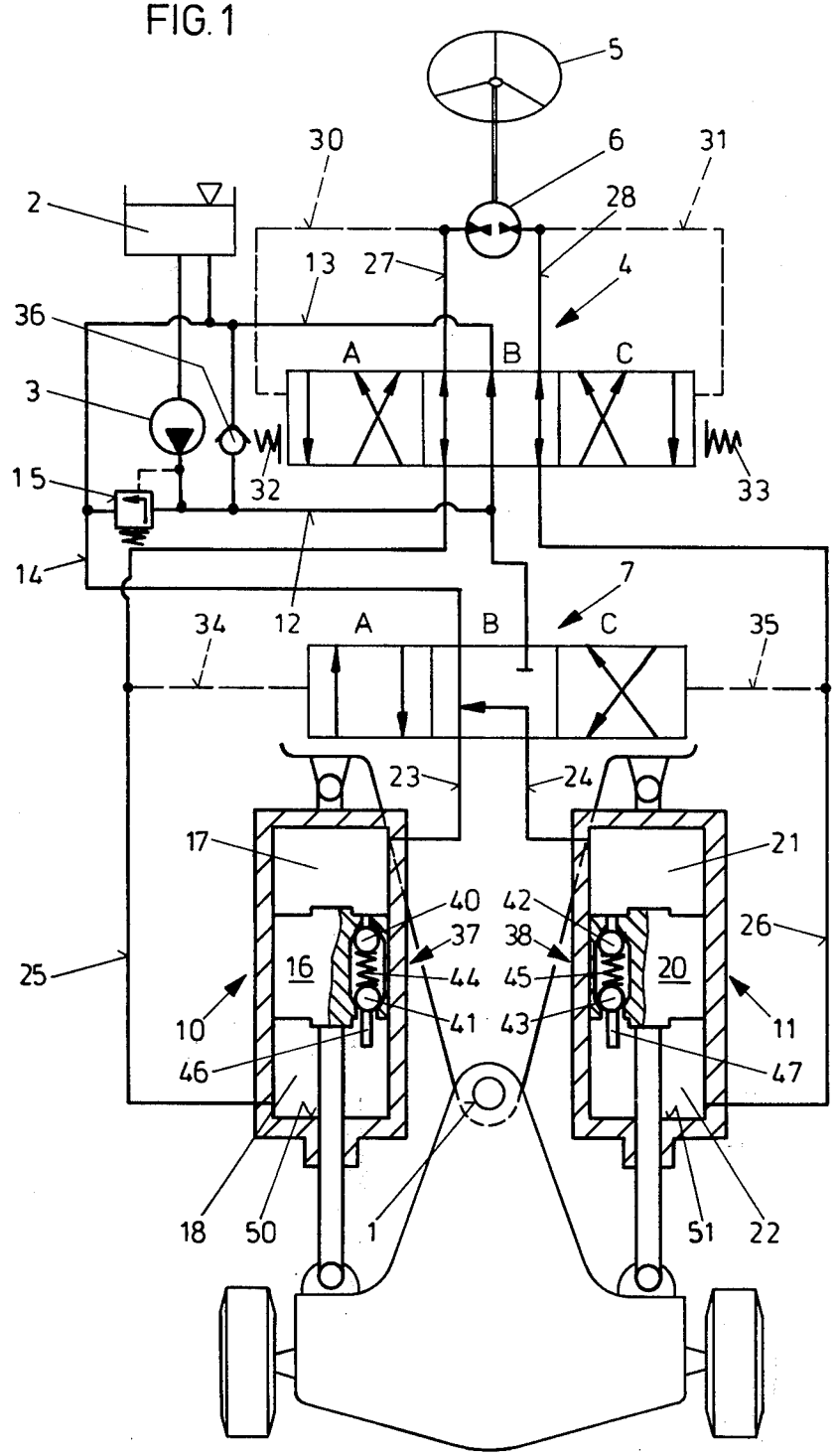

Reference is now made to FIG. 1 wherein is illustrated the front end steering arrangement comprising the toggle joint 1 and the auxiliary or power boost steering system of conventional nature which comprises the oil sump or tank 2 feeding oil to the input of engine driven high pressure power pump 3. A steering control valve 4 and manually operable metering pump 6 driven by steering wheel 5 are illustrated wherein it is seen that the metering pump effects reversible feed in the usual manner to the valve 4 interconnecting valve 7 which coacts with the valve 4 in a manner to be described. The steering apparatus comprises the usual double acting servomotors 10 and 11 which have pressure chambers understood to be selectively pressurized or exhausted in accordance with the positions A, B, or C of the multiway valves 4 and 7 which may be the usual piston or spool valves.

The output of power pump 3 communicates via line 12 with both valves 4 and 7 while sump 2 communicates via lines 13 and 14 either to valve 4 or to valve 7. A pressure regulator 15 is provided as shown for limiting high pressure from pump 3 to a predetermined maximum.

Servomotor 10 has pressure chambers 17 and 18 with intermediate piston 16 and servomotor 11 has pressure chambers 21 and 22 with intermediate piston 20. Pressure chambers 17 and 21, for the straight ahead position of the wheels shown, communicate via respective lines 23 and 24 and valve 7 with return line 14 to the sump. Pressure chambers 18 and 22, however, communicate via respective lines 25 and 26 through valve 4 and respective lines 27 and 28 with metering pump 6. Valve 4 is reversibly shifted by pressure from the metering pump via lines 30 and 31, branching respectively from lines 27 and 28, connecting to the ends of the valve 4 in suitable pressure chambers as will be understood, all of which is conventional, the valve being maintained in central position for straight ahead steering by compression springs 32 and 33 in the usual manner.

Thus, in the straight ahead position shown in FIG. 1, valve 4 is in non-shifted position B but will be understood to be shifted by differential pressure in lines 30 and 31 to position A or C from position B for effecting steering in one direction or the other. It will, of course, be obvious that valve 4 could be manually shifted in a known manner by way of steering wheel 5.

Figure 2:
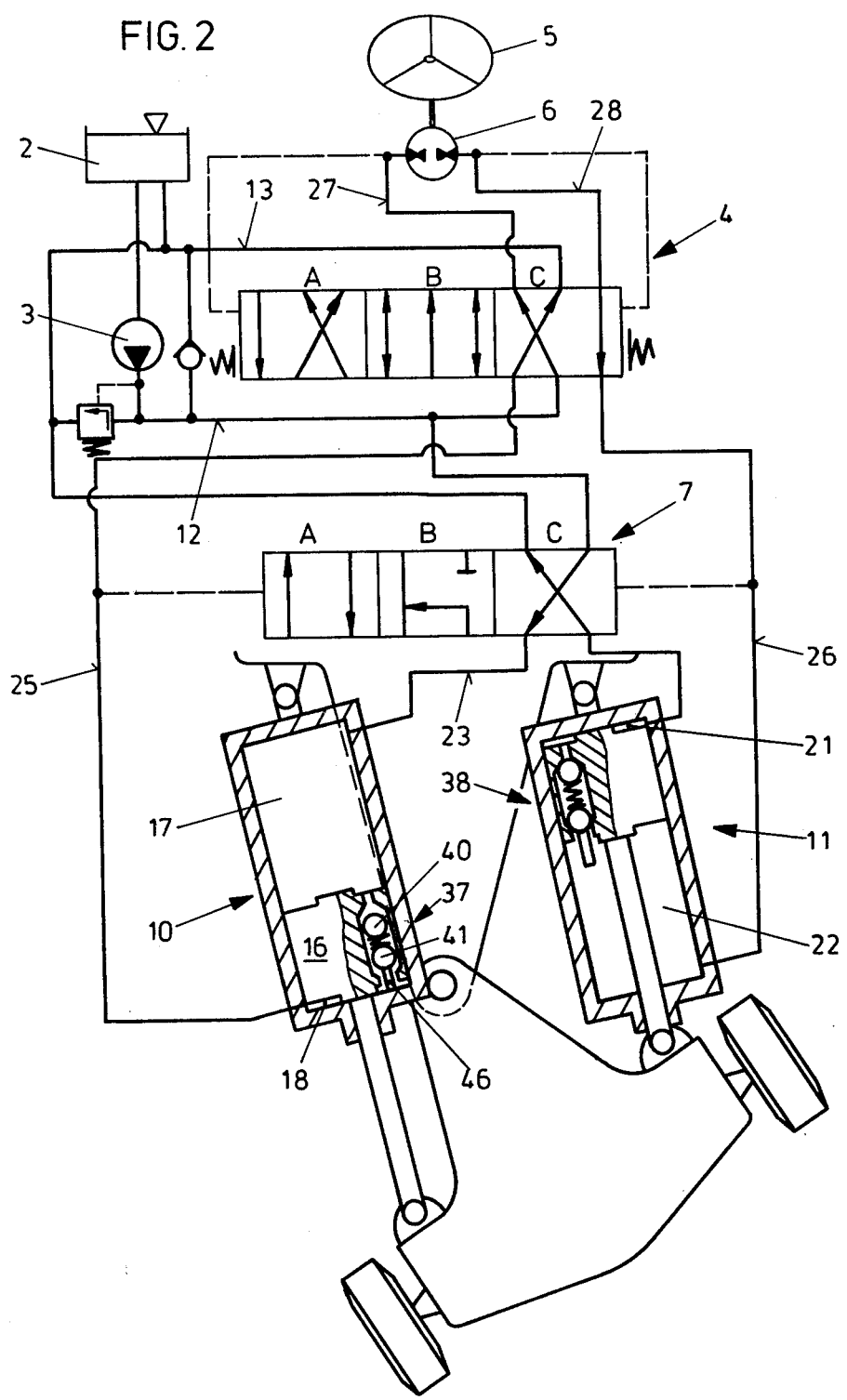
FIG. 2 shows the position of the valve means and servomotors for steering in one direction and indicating the locked limiting position of the steered wheels.

Valve 7 is differentially pressure operated via lines 34 and 35 at respective ends thereof which receive pressure by interconnecting with line 25 or 26, respectively, dependent on the direction of pressure effected by operation of metering pump 6, existing as a differential pressure in the pressure chambers 18 and 22 during operation of the system, which will be more clearly understood upon subsequent description of the actuated position of the servomotors as shown in FIG. 2.

In the event of failure of pressure from the power pump 3, a suction valve 36 connects across lines 12 and 13 and will open to permit oil under manual force pressure to be received from metering pump 6 via valve 4 and return line 13. At that time, differential pressure effected by pump 6 which actuates valve 4 is then the only pressure available for steering in either of the chambers 18 or 22. Otherwise, as has heretofore been set forth, in steering in a particular direction one servomotor rceives power pump pressure directly while the other servomotor receives both power pump and metering pump pressures, likewise to be more clearly understood in the subsequent description of FIG. 2.

Each piston is provided with a pair of back-to-back ball check valves maintained in normally closed position by a common spring as shown in FIG. 1. Thus, piston 16 has a check valve arrangement 37 while piston 20 has a check valve arrangement 38. In piston 16 the check valves which are, of course, non-return valves are in a through passage of the piston and comprise the ball check valves 40 and 41 which seat against suitably provided conical surfaces at the ends of the throughbore leading to respective faces of the piston. The common spring 44 maintains the normally closed position. In a similar manner, the check valves 42 and 43 maintained normally closed by spring 45 are provided in the throughbore of piston 20. The valves 41 and 43 are provided with integral valve actuating pins, respectively, 46 and 47, extending into respective chambers 18 ad 22. It will be understood that when either piston arrives toward the respective cylinder end walls 50 or 51 the respective pin will open the respective valve 41 or 43 by mechanical abutment against the respective end wall 50 or 51.

In the neutral position of the system, the chambers 18 and 22 communicate with respective ends of the metering pump so that either can be pressure fed by manual power depending upon direction of rotation of steering wheel 5. Likewise, chambers 17 and 21 communicate with the sump at this time. Accordingly, the straight ahead position of the wheels is maintained.

OPERATION

Reference is now made to FIG. 2, and assuming that the steering wheel 5 has been rotated counter-clockwise, the servomotor pistons of servomotors 10 and 11 take the positions shown to actuate the steered wheels through the toggle linkage. It will be noted that valve 4 has been shifted to the position C by differential pressure of metering pump 6 via lines 27 and 28 and pressure fluid from pump 3 can now flow directly via lines 12 and 23 through valve 7 to chamber 17. Valve 7 has been shifted to the C position by differential pressure in lines 25 to 34 and 26 to 35. Thus, chamber 18 is exhausting to sump 2 via line 25, valve 4, line 13. At the same time, power pump 3 output goes through valve 4 to the metering pump 6 and combined pressure exists in chamber 22 via line 28, line 26. Chamber 21 exhausts via line 24, valve 7, line 14 to the sump 2.

As seen in FIG. 2, steering control valves 4 and 7 in position C, piston 16 in servomotor 10 is at the downward end of its stroke and piston 20 is at the upper end of its stroke. The pin 46, which is the actuating means for shunt valves 37 comprising the throughbore in the piston and ball check valve 41, has by engagement with the end wall 50 of the cylinder moved valve 41 upwardly to open the throughbore at the proximate face of the piston. Pressure in chamber 17 via valve 7 directly from power pump 3 has opened ball check valve 40 at the opposite face of the piston. This pressure flow bypasses metering pump 6. Thus, the throughbore in piston 16 forms a shunt flow passage so that high pressure in pressurized chamber 17 passes to low pressure chamber 18, which is at that time exhausting to sump 2 via line 25 and the multiway valve 4 of the control valve means and line 13. In position C of valve 7 the other servomotor 11 has metering pump pressure, the output of pump 6, in chamber 22. Chamber 21 is exhausting via line 24 through multiway valve 7. In servomotor 11 at this time, there is no shunt flow to low pressure, because in chamber 22 is only a low metering pump pressure compared with the high pressure of power pump 3. The drop in overall piston drive force in servomotor 10 is sufficient to relieve the heavy stress on any limit stop. The retention of pressure in chamber 22 makes certain that the control valves 4 and 1 and the steered wheels remain securely in steered position.

The control valve means 4 and 7 can be returned to neutral or straight ahead steering if no power acts on hand wheel 5. In that case, the control valve means come back to the position shown in FIG. 1.

For steering in the opposite direction, the hand wheel 5 is rotated so as to bring control valve 4 to the position A in which case chamber 18 is in communication with metering pump 6 while chamber 17 is in communication via valve 7, now in position A, with sump 2. Obviously, servomo $b_r$ 11 now will experience shunt flow via engagement of pin 47 with the bottom end 51 of the servomotor cylinder as will be readily understood. As to servomotor 10, the reversal of pressure between chambers effects closing of ball check valve 40.

Chamber 21 of servomotor 11 would then have direct communication with power pump 3 via valve 7 in position A for the opposite direction of turn. On the contrary, chamber 22 would then be relieved of pressure via shunt flow, exhaust passing through valve 4, in position A, line 13, to sump 2 and the reduction in drive force against the limit stop thus achieved. Likewise, with the control valves in position A, chamber 18 would receive the combined pressure of pumps 3 and 6.

Figure 3:
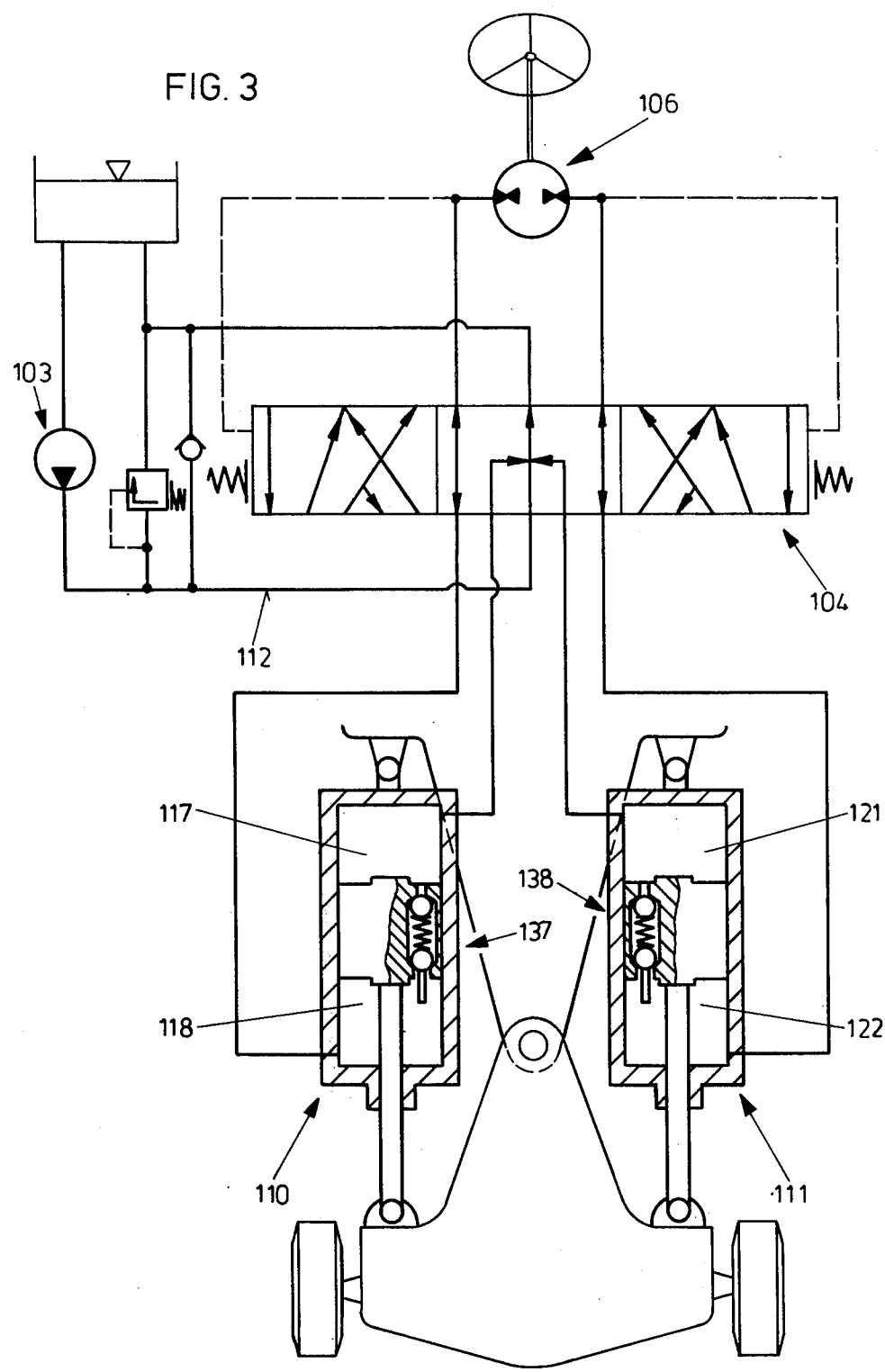
FIG. 3 is a schematic view disclosing an embodiment of the system using a single symmetrically arranged type of piston or valve diagrammatically illustrated which serves the function of both of the valves shown in FIGS. 1 and 2.

Referring to FIG. 3, the essential difference is that the control valve means of FIG. 1 comprising valves 4 and 7 is combined into a single piston or spool valve 104 which is totally symmetrical in its passage construction, i.e., for example, lands, grooves and bores and thus effects control of two systems. A valve of that type is shown in FIGS. 1 and 2 of German OS No. 1 755 033.

In the course of steering, a portion of the output of power pump 103 is fed directly to chamber 118 of servomotor 110 or to chamber 122 of servomotor 111 via metering pump 106. On the other hand, chambers 117 or 121 are fed directly via line 112 from the power pump 103, bypassing the metering pump 106. The shunt flow operation via the shunt flow valve means 137 and 138 is the same as heretofore described in connection with FIGS. 1 and 2.

It will therefore be seen that a simple and effective system of dual servomotor control for heavy vehicles which precludes high stresses against limit stops has been achieved. Further, there is no loss of synchronization between manual rotation of the steering wheel and the power operated turning of the steered wheels nor are any expensive components required to achieve the purposes of the invention.

What is claimed is:

1. In a dual servomotor control system for power steering apparatus of the kind having a manually operable metering pump and an engine driven power pump, a pair of double acting cylinders each having a pair of pressure chambers and a respective piston intermediate said chambers;

normally closed shunt valve means carried by each piston to shunt pressure from one pressure chamber to the other of the respective cylinders through said piston when said shunt valve means is opened;

control valve means operable responsive to steering wheel rotation for effecting selective pressure and exhaust control of said pressure chambers for steering mechanism operation wherein one pressure chamber of each cylinder is pressurized while the other is exhausted;

each shunt valve means having actuating means operative to effect opening of the respective shunt valve means toward the end of travel of the respective piston to reduce subsequent power pump pressure force acting thereon by shunting high pressure in one pressure chamber to low pressure in the other pressure chamber of the respective cylinder.

2. In a system as set forth in claim 1, said shunt valve means comprising a throughbore in each said pistons having open ends terminating at respective faces thereof;

and a respective valve member biased to close each end of said throughbore.

3. In a system as set forth in claim 1, said shunt valve means comprising a throughbore in said piston and having open ends terminating at respective faces thereof;

a respective valve member biased to close each end of said throughbore;

each said valve member comprising a ball check valve in said throughbore;

respective valve seats in said throughbore and a common spring in said throughbore intermediate said ball check valves biasing said ball check valves against respective seats.

4. In a system as set forth in claim 1, said shunt valve means comprising a throughbore in each of said pistons having open ends terminating at respective faces thereof;

and a respective valve member biased to close each end of said throughbore;

said actuating means comprising a pin disposed to protrude through a respective open end of the throughbore of each piston to open respective valve members by engagement with a respective cylinder end wall toward the end of travel of the respective piston.

5. In a system as set forth in claim 1, said shunt valve means comprising a throughbore in each of said pistons having open ends terminating at respective faces thereof;

and a respective valve member biased to close each end of said throughbore;

said actuating means comprising a pin disposed to protrude through an open end of the throughbore of each piston to open one said valve member and being carried thereby to engage at a respective cylinder end to open the respective said one valve member as said piston approaches said cylinder end thereby opening communication between the respective pressure chamber at said cylinder end and said throughbore;

said control valve means being operable to effect selective connections for communication with said pumps and cylinders for steering control whereby said pressure chamber is under low pressure and the other pressure chamber is under high pressure effective to open the other valve member to establish shunt flow between said pressure chambers via said throughbore.

6. In a system as set forth in claim 1, said control valve means comprising selectively positionable multiway valve means having connections therebetween and connections for communicating with said power pump and said metering pump and the pressure chambers of said cylinders by selective connection responsive to selected position to effect control functions for steering, said selective connection being operative to communicate output of said power pump with input of said metering pump for only one pressure chamber of each of said cylinders for pressurization thereof while the other pressure chamber is being pressurized directly from said power pump.

7. In a system as set forth in claim 1, said control valve means comprising selectively positionable multiway valve means having connections therebetween and connections for communicating with said power pump and said metering pump and the pressure chambers of said cylinders by selective connection responsive to selected position to effect control functions for steering;

said selective connection being operative to communicate output of said power pump with input of said metering pump for only one pressure chamber of each of said servomotors for pressurization thereof, the other pressure chamber being pressurized directly from said power pump;

said shunt valve means comprising a throughbore in each said piston having open ends terminating at respective faces thereof;

and a respective valve member biased to close each end of said throughbores.

8. In a system as set forth in claim 1, said control valve means comprising selectively positionable multiway valve means having connections therebetween and connections for communicating with said power pump and said metering pump and the pressure chambers of said cylinders by selective connection responsive to selected position to effect control functions for steering;

said selective connection being operative to communicate output of said power pump with input of said metering pump for only one pressure chamber of each of said servomotors for pressurization thereof, the other pressure chamber being pressurized directly from said power pump;

said shunt valve means comprising a throughbore in each said piston having open ends terminating at respective faces thereof;

a respective valve member biased to close each end of said throughbore;

respective valve seats in said throughbore and a common spring in said throughbore intermediate said valve members biasing said valve members against respective seats.

9. In a system as set forth in claim 1, said actuating means being disposed in only one pressure chamber of each cylinder and being operative while that pressure chamber is exhausting under control of said control valve means;

said shunt valve means comprising a throughbore in the respective piston having an end open at each face thereof and further comprising a respective valve closing each said open end wherein the valve proximate said one chamber is opened by said actuating means;

the other pressure chamber being pressurized at that time under control of said control valve means wherein fluid pressure opens said other valve to effect shunt flow through the respective piston.

10. In a system as set forth in claim 1, said control valve means comprising selectively positionable multiway valve means having connections therebetween and connections for communicating with said power pump and said metering pump and the pressure chambers of said cylinders by selective connection responsive to selected position to effect control functions for steering, said selective connection being operative to communicate output of said power pump with input of said metering pump for only one pressure chamber of each of said cylinders for pressurization thereof while the other pressure chamber is pressurized directly from said power pump;

said actuating means being disposed in only one pressure chamber of each cylinder and being operative while that pressure chamber is exhausting under control of said control valve means;

said shunt valve means comprising a throughbore in the respective piston having an end open at each face thereof and further comprising a respective valve closing each said open end wherein the valve proximate said one chamber is opened by said actuating means;

the other pressure chamber being pressurized at that time under control of said control valve means wherein fluid pressure opens said other valve to effect shunt flow through the respective piston.

* * * * *